United States Patent [19]
Clark et al.

[11] Patent Number: 6,032,522
[45] Date of Patent: Mar. 7, 2000

[54] APPARATUS AND METHOD FOR INSPECTING INFLATION OF AND SUPPORTED WEIGHT ON VEHICLE TIRES

[75] Inventors: Alfred L. Clark; Frank S. Barnes, both of Boulder; Richard Frey; Tom Gormley, both of Louisville, all of Colo.

[73] Assignee: Synergos, LLLP, Englewood, Colo.

[21] Appl. No.: 09/136,026

[22] Filed: Aug. 18, 1998

[51] Int. Cl.[7] .............................. E01C 23/00; G01G 3/14; G06K 9/74
[52] U.S. Cl. ........................... 73/146; 177/210 R; 356/71
[58] Field of Search .................................. 73/146, 146.2; 177/210 R; 356/71

[56] References Cited

U.S. PATENT DOCUMENTS

| | | | |
|---|---|---|---|
| 4,095,464 | 6/1978 | Breedijk | 73/146 |
| 5,088,321 | 2/1992 | Kajikawa et al. | 73/146 |
| 5,092,166 | 3/1992 | Wada et al. | 73/146 |
| 5,172,590 | 12/1992 | Adachi et al. | 73/146 |
| 5,174,151 | 12/1992 | Adachi et al. | 73/146 |
| 5,260,520 | 11/1993 | Muhs et al. | 177/210 R |
| 5,289,718 | 3/1994 | Mousseau | 73/146 |
| 5,347,588 | 9/1994 | Wilson | 382/1 |
| 5,396,817 | 3/1995 | Rosensweig | 73/146.2 |
| 5,445,020 | 8/1995 | Rosensweig | 73/146.2 |
| 5,616,839 | 4/1997 | Chen et al. | 73/146 |
| 5,641,900 | 6/1997 | Di Bernardo et al. | 73/146 |
| 5,753,810 | 5/1998 | Bass | 73/146.3 |

*Primary Examiner*—Benjamin R. Fuller
*Assistant Examiner*—Abdullahi Aw-Musse
*Attorney, Agent, or Firm*—John R. Flanagan; John K. Flanagan; Flanagan & Flanagan

[57] ABSTRACT

A vehicle tire inspection apparatus includes a flat plate, a flexible bladder containing a quantity of fluid, and transducers on the plate. The plate is made of a transparent yieldable resilient bendable material capable of transmitting an inflated vehicle tire footprint and of undergoing a deflection in response to the supported weight on the tire applied thereon. The bladder is supported on the top side of the plate and has an upper opaque portion of a first color, a lower transparent portion and an enclosed interior cavity. The fluid contained within the cavity is of a second color different from the first color of the upper bladder portion. The fluid is displaceable within the bladder as the upper bladder portion is forced toward the lower bladder portion when the tire is applied upon the upper bladder portion so as to create an image of the footprint of the tire viewable on the bottom side of the plate by contrast between the second color of the fluid viewable where a tread of the tire does not press the upper bladder portion against the lower bladder portion on the top side of the plate and the first color of the opaque material of the upper bladder portion viewable where the tread of the tire presses the upper bladder portion against the lower bladder portion on the top side of the plate. The transducers are attached to the bottom side of the plate and undergo deformations proportional to the deflection of the plate and produce electrical signals proportional to the deformations.

15 Claims, 8 Drawing Sheets

APPARATUS AND METHOD FOR INSPECTING INFLATION OF AND SUPPORTED WEIGHT ON VEHICLE TIRES

BACKGROUND OF THE INVENTION

1. Field of the Invention

The present invention generally relates to means for inspecting the condition of tires and, more particularly, is concerned with an apparatus and method for inspecting the inflation of and supported weight on inflated vehicle tires.

2. Description of the Prior Art

A tire should be inflated to a certain pressure to achieve an optimum degree of performance and safety. The inflation of the tire should be within preset maximum and minimum limits. The supported weight on the tire also affects the tire's performance, safety and fuel efficiency or consumption. The weight of a vehicle should be distributed as evenly as possible in order for each tire of the vehicle to carry as close to the same portion of the total weight of the vehicle as other tires of the vehicle. Any cargo in or on the vehicle should be arranged so as to provide for as even a distribution of weight as possible. A tire should be inspected from time to time to ensure that the pressure in it and the weight on it is appropriate for the tire.

A variety of apparatuses have been developed over the years for inspecting the condition of tires on and off vehicles. Representative examples of prior art are disclosed in U.S. Pat. No. 4,095,464 to Breedijk, U.S. Pat. No. 5,088,321 to Kajikawa et al., U.S. Pat. No. 5,092,166 to Wada et al., U.S. Pat. Nos. 5,172,590 and 5,174,151 to Adachi et al., U.S. Pat. No. 5,260,520 to Muhs et al., U.S. Pat. No. 5,289,718 to Mousseau, U.S. Pat. No. 5,347,588 to Wilson, U.S. Pat. Nos. 5,396,817 and 5,445,020 to Rosensweig, U.S. Pat. No. 5,616,839 to Chen et al., U.S. Pat. No. 5,641,900 to Di Bernardo et al. and U.S. Pat. No. 5,753,810 to Bass. While these prior art apparatuses appear satisfactory in use for the specific purposes for which they were designed, none of them seem to provide a comprehensive and yet simple solution for the need at hand.

Consequently, a need remains for an apparatus which provides a more desirable solution to the aforementioned need in the prior art without introducing any problems in place thereof.

SUMMARY OF THE INVENTION

The present invention provides a vehicle tire inspection apparatus and method which is designed to satisfy the aforementioned need. The vehicle tire inspection apparatus and method of the present invention provides for real time measurement of the size of a footprint and thus deflection of the tire and thereby the inflation condition of each tire and the distribution of supported weight of a vehicle on the tires. The multiple tire inspection apparatus and method thus provides a system to inspect tires for under- and over-inflation and for proper distribution of supported weight on the tires while the tires are stationary or in motion on the vehicle. The multiple tire inspection apparatus and method may be used without making any additions to the vehicle or tires.

Accordingly, the present invention is directed to an apparatus for inspecting the condition of and/or the supported weight on an inflated vehicle tire. For inspecting the inflation condition of the inflated tire, the apparatus comprises: (a) a plate having opposite top and bottom sides and made of a substantially transparent material capable of transmitting a footprint of an inflated vehicle tire; (b) a bladder supported on the top side of the plate and having opposite upper and lower portions and an enclosed interior cavity, the upper portion of the bladder comprised of a material of a first color, at least the lower portion of the bladder comprised of a substantially transparent material; (c) a quantity of fluid contained within the cavity of the bladder of a second color different from the first color of the upper portion of the bladder, the fluid being displaceable within the bladder as the upper portion of the bladder is forced toward the lower portion thereof when the inflated vehicle tire is applied upon the upper portion of the bladder so as to create an image of the footprint of the inflated vehicle tire viewable on the bottom side of the plate by contrast between the second color of the fluid viewable where a tread of the inflated vehicle tire does not press the upper portion of the bladder against the lower portion thereof on the top side of the plate and the first color of the opaque material of the upper portion of the bladder viewable where the tread of the inflated vehicle tire does press the upper portion of the bladder against the lower portion thereof on the top side of the plate; and (d) means for receiving and converting the image of the footprint to a measured quantity correlated to the condition of inflated vehicle tire. The condition inspected is ordinarily inflation but alternatively could be wear, deflection and/or traction of the tire.

More particularly, the fluid is a light-reflecting gelatinous substance and the apparatus further comprises a cover sheet overlying and covering the bladder for receiving thereon the inflated vehicle tire applied on the bladder. The bladder and cover sheet can be integrated with one another such that the cover sheet forms the upper portion of the bladder.

For inspecting the supported weight on an inflated vehicle tire, the apparatus comprises: (a) the plate having opposite top and bottom sides, the top side for receiving the supported weight on an inflated vehicle tire applied thereon, the plate being made of a yieldable resilient bendable material capable of undergoing a deflection in response to the supported weight on the inflated vehicle tire applied thereon; (b) transducer means attached to the bottom side of the plate for undergoing a deformation proportional to the deflection of the plate and for producing an electrical signal proportional to the deformation; and (c) means for receiving and converting the electrical signal to a measured quantity proportional to the supported weight applied by the inflated vehicle tire to the plate. More particularly, the plate is formed by a plurality of strips disposed in a side-by-side relationship. Each strip has opposite top and bottom sides. The top side of each strip receives a portion of the inflated vehicle tire applied thereon. The strips are made of the yieldable resilient bendable material capable of undergoing deflection in response to the inflated vehicle tire applied thereon. The transducer means includes a plurality of piezoelectric sensors each secured to the bottom side of one of the strips of the plate.

The present invention is further directed to a method for inspecting the inflation condition of and/or the supported weight distribution on inflated tires of a vehicle. The steps of the method for inspecting the inflation condition include: (a) detecting arrival of a vehicle at an inspection apparatus; (b) detecting a footprint for each tire of the vehicle; (c) calculating measured quantities representing the size of the footprint for each tire of the vehicle; and (d) comparing the measured quantity representing the size of each footprint against absolute upper and lower limits. The steps further include comparing the measured quantities representing the sizes of the footprints of the tires against one another to find any deflated tires and generating a report of the absolute and relative footprint sizes of the tires. The steps of the method for inspecting the supported weight include: (a) detecting arrival of a vehicle at an inspection apparatus; (b) detecting supported weight for each tire of the vehicle; (c) calculating measured quantities representing the magnitude of the supported weight for each tire of the vehicle; and (d) comparing the measured quantities representing the supported weights of the tires to determine the weight distribution of the vehicle on the tires. The method further includes the step of generating a report of the supported weights of the tires.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
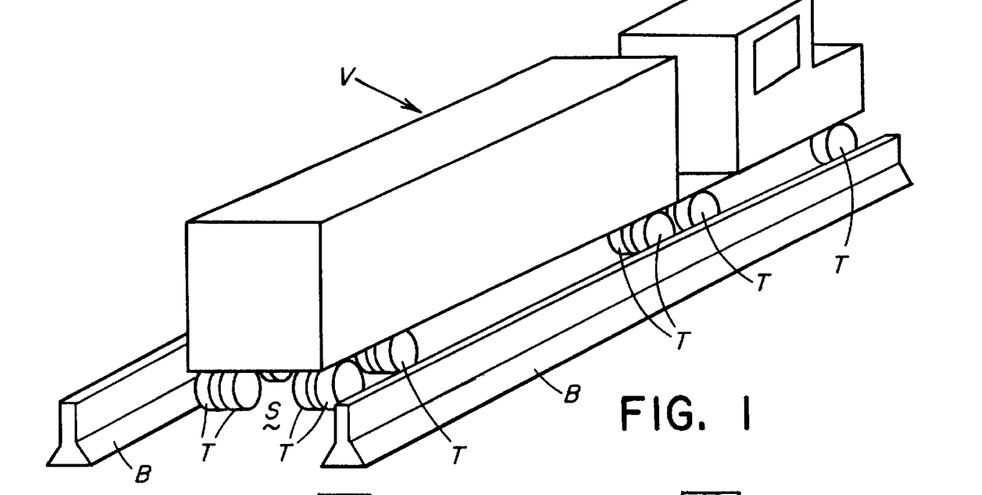
FIG. 1 is a perspective view of a tractor trailer truck disposed between a pair of barriers used for aligning tires thereon over areas of a surface below which are disposed one or more of the vehicle tire inspection apparatuses of the present invention.
Figure 2:
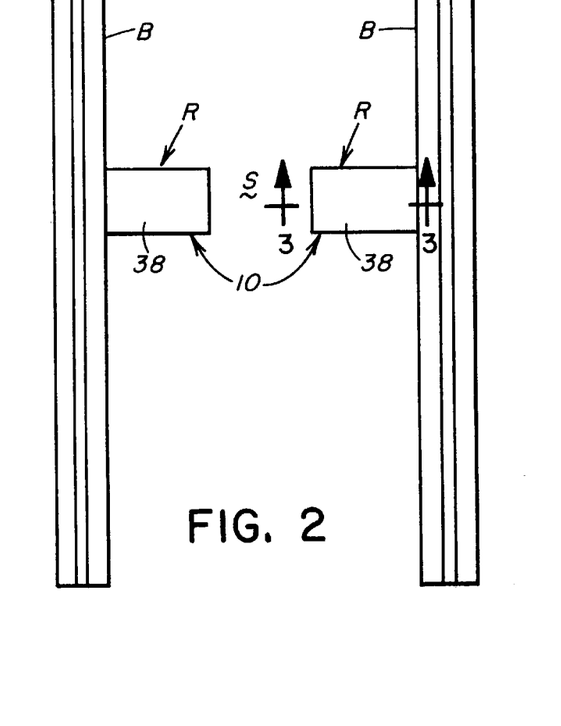
FIG. 2 is a top plan view of FIG. 1 with the truck removed showing the barriers and a pair of the vehicle tire inspection apparatuses of the present invention.
Figure 3:
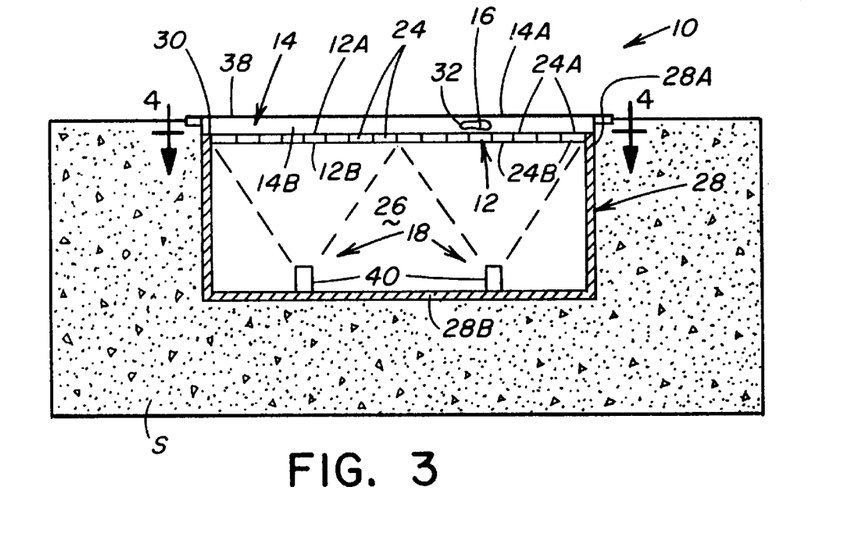
FIG. 3 is an enlarged vertical sectional view taken along line 3—3 of FIG. 2 through one of the pair of vehicle tire inspection apparatuses.
Figure 4:
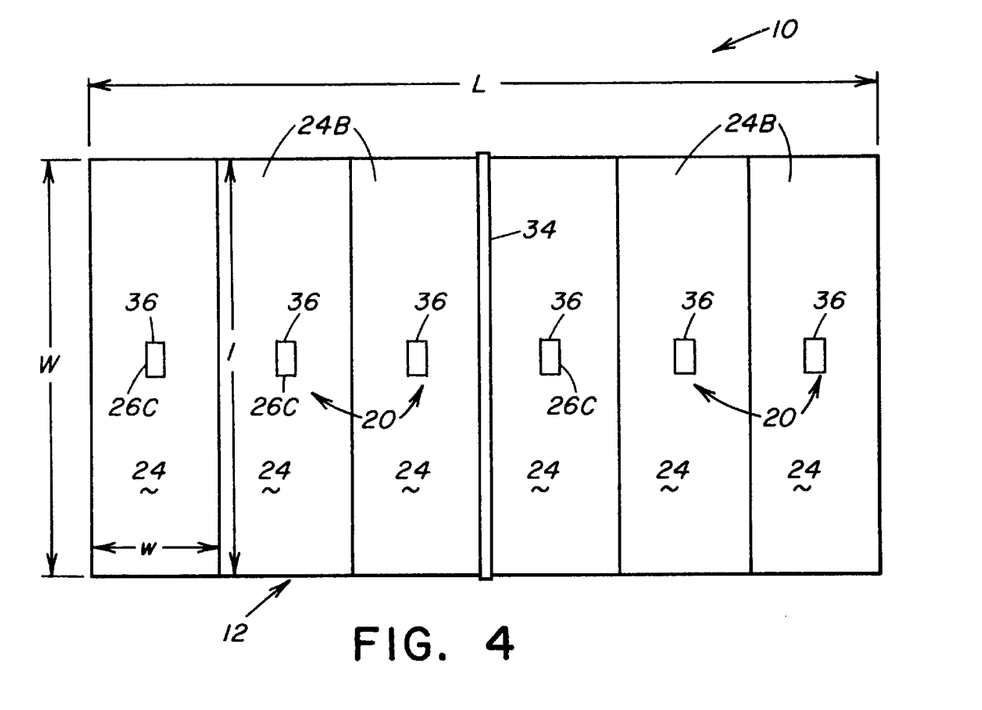
FIG. 4 is a bottom plan view as seen along line 4—4 of FIG. 3 showing side-by-side strips forming a plate of the vehicle tire inspection apparatus, transducer sensors secured on bottom sides of the strips and a central stripe for providing a line of reference on the plate.
Figure 5:
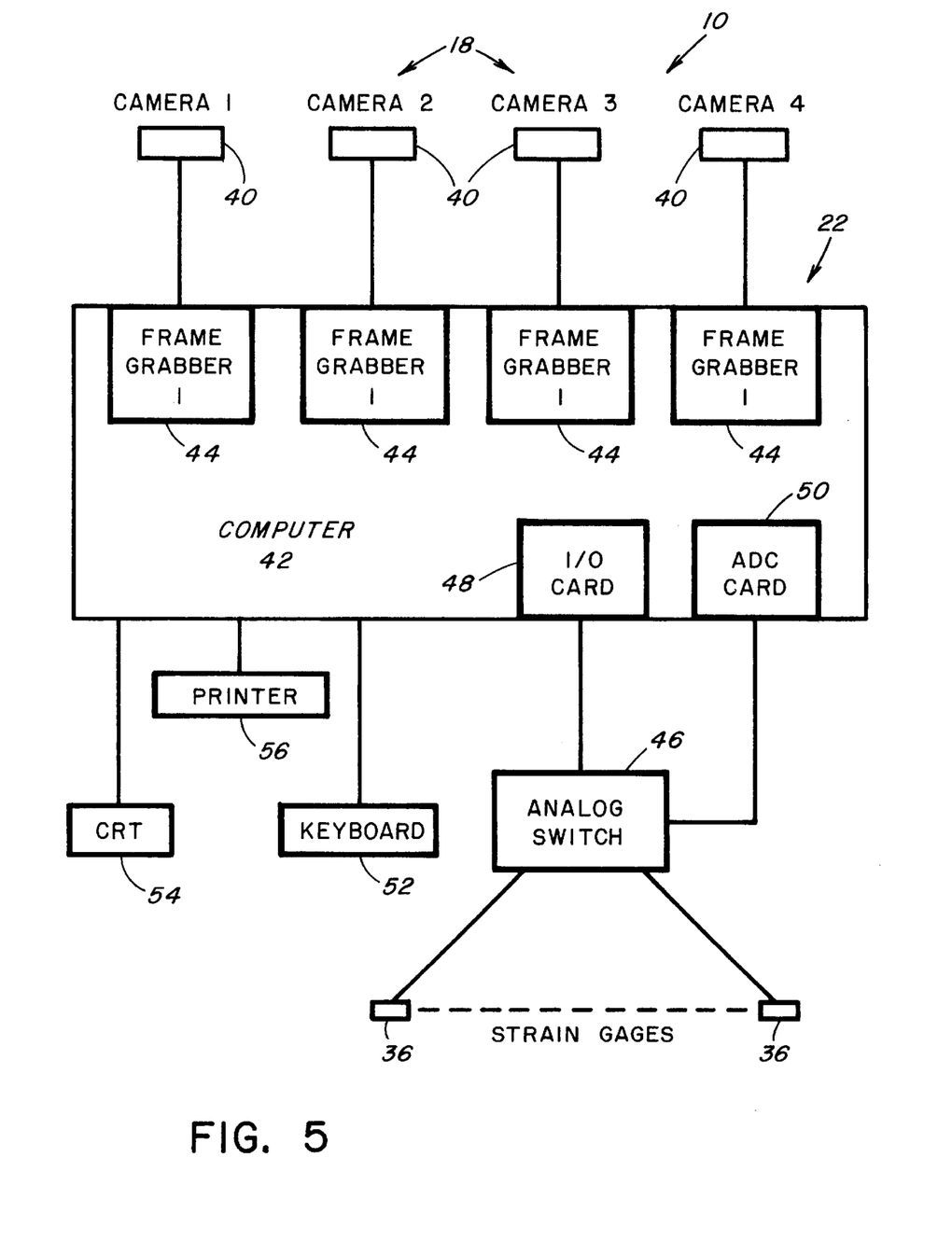
FIG. 5 is a block diagram view of components making up portions of the vehicle tire inspection apparatus of the present invention.

Referring to the drawings and particularly to FIGS. 1 and 2, there is illustrated one exemplary arrangement for the use a vehicle tire inspection apparatus, generally designated 10, of the present invention being shown in FIGS. 3 to 5. In the illustrated arrangement, a pair of the multiple tire inspection apparatuses 10 are used in conjunction with a pair of laterally spaced barriers B. By merely driving a vehicle V, such as an eighteen-wheel tractor trailer truck, between the barriers B in either direction, the tires T of the vehicle V can be easily and readily brought into alignment over regions R of a road surface S where one or more of the inspection apparatuses 10 are disposed. One inspection apparatus 10 may be disposed adjacent to each of the barriers B or, preferably, more than one of the inspection apparatuses 10 may be disposed adjacent to each of the barriers B. Each grouping of inspection apparatuses 10 would be disposed adjacent to one of the barriers B and aligned with the other inspection apparatuses 10 such that the dual sets of the tires T disposed on one axle and on opposite sides of the vehicle V may be inspected at the same time. The vehicle tire inspection apparatus 10 of the present invention is most advantageously employed in the trucking industry where substantially more tires are employed, miles traveled, weight supported and fuel used per vehicle than in the case of passenger cars. However, the use of the vehicle tire inspection apparatus 10 need not be so limited in its applications.

Referring to FIGS. 3 to 5, the vehicle tire inspection apparatus 10 basically is adapted for inspecting either or both of the inflation condition of and the supported weight on an inflated vehicle tire T. For inspecting the inflation condition of the inflated tire T, the apparatus 10 includes a plate 12, a flexible bladder 14, a quantity of fluid 16 contained in the bladder 14, and first means 18 for receiving an image I of the footprint F of the inflated tire T and converting the image I to a measured quantity correlated to the inflation condition of inflated tire T. Additionally, for inspecting the supported weight on the inflated tire T, the apparatus 10 further includes transducer means 20 for undergoing deformation and producing an electrical signal proportional to the deformation, and second means 22 for receiving and converting the electrical signal to a measured quantity proportional to the supported weight applied by the inflated vehicle tire to the plate 12.

The plate 12 has opposite top and bottom sides 12A, 12B and is made of a substantially transparent material capable of transmitting the footprint F of the tire T as well as made of a yieldable resilient bendable material capable of undergoing a deflection in response to the weight of the tire T being applied and received on the top side 12A of the tire T. There are many plastic materials well-known to one of ordinary skill in the art that are both transparent and yieldable resilient and bendable. More particularly, the plate 12 is substantially flat and preferably is formed by a plurality of strips 24 disposed in a side-by-side relationship. The strips 24 are made of the same material as described above and thus are capable of undergoing deflection in response to the inflated tire T being applied thereon. Each strip 24 has opposite top and bottom sides 24A, 24B and is much narrower than the inflated tire T such that the top side 24A of each strip 24 has only a portion of the inflated tire T applied thereon.

Figure 7A:
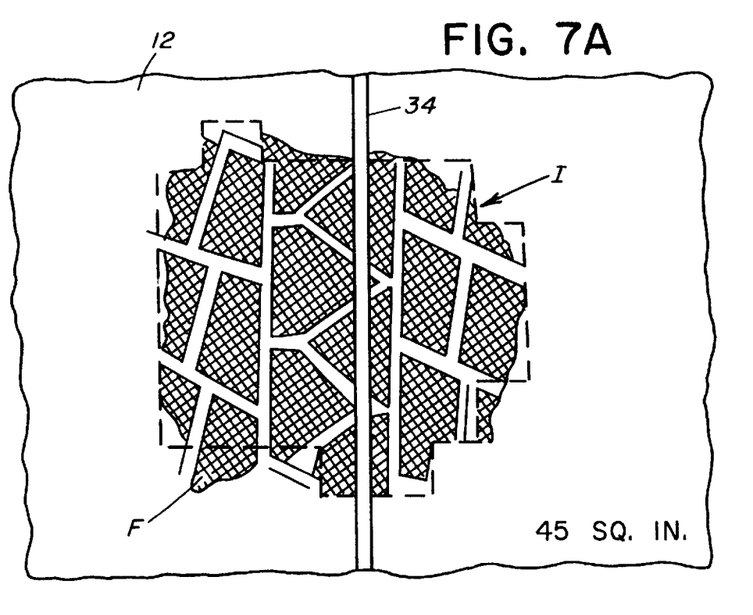
FIGS. 7A and 7B are plan views of images of two different footprints of inflated vehicle tires produced by the vehicle tire inspection apparatus of the present invention.
Figure 7B:
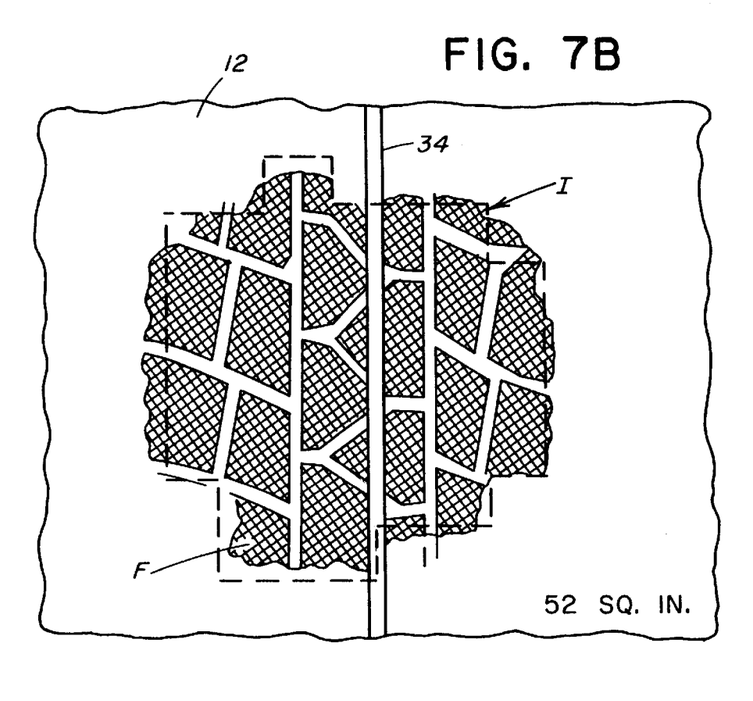

The plate 12 is mounted near the level of the road surface S upon which the vehicle V is driven and disposed over a chamber 26 extending below the elevation of the road surface S. For supporting the plate 12 a support receptacle 28 is provided in a box-like rigid structure S, such as constructed of cement or other suitable rigid material, buried in the ground such that the receptacle 28 provides a top surface 30 at the elevation of the road surface S. The plate 12 at opposing portions of its periphery is suitably disposed within and attached to an open top 28A of the receptacle 28. The open top 28A of the receptacle 28 and the plate 12 both have rectangular configurations. The plate 12 has a length L greater than its width W. As can be understood in comparison of the size of the images I with the surrounding area of the plate 12 in FIGS. 7A and 7B, the plate 12 has an area substantially greater than the respective areas of the portions of tires T which contact the road surface S and thus the plate 12 at any given time. Each strip 24 has a width w extending perpendicular to the width W of the plate 12 and much less than the width W of the plate 12, and a length "l" the same as the width W of the plate 12 and much greater than the width "w" of the strip 24. Thus, each strip 24 has an area such that more than one strip 24 is required to support one tire T. Each strip 24, like the plate 12, is deflectable and will undergo a deflection caused by the supported weight of the portion of one tire T applied on it.

The flexible bladder 14 is supported within the chamber 26 of the receptacle 28 on the top side 12A of the plate 12. The bladder 14 has opposite upper and lower portions 14A, 14B and defines an enclosed interior cavity 32. The upper portion 14A of the bladder 14 is comprised of a substantially opaque material of a first color, such as black. The lower portion 14B of the bladder 14 is comprised of a substantially transparent material. At its lower portion 14B, the bladder 14 is mounted on the top side 12A of the plate 12 and, particularly, on the top sides 24A of the strips 24 of the plate 12. The lower portion 14B of the bladder 14 may be glued to the top side 12A of the plate 12 such that the bladder 14 and plate 12 are replaceable together, or the bladder 14 may removably rest on the plate 12 such that the bladder 14 and plate 12 are replaceable separately. The bladder 14 has a size which substantially covers the top side 12A of the plate 12 but which also does not result in any portion of the bladder 14 extending out of the chamber 26 below the road surface S. Preferably, the bladder 14 is comprised of a substantially rubber material and is reinforced with a substantially nylon and polyurethane material or any other suitable materials.

The quantity of fluid 16 contained within the enclosed interior cavity 32 of the bladder 14 of a second color, such as white, different from the first color of the upper portion 14A of the bladder 14 and capable of providing a sharp contrast in color between the upper portion 14A of the bladder 14 and the fluid 16. The quantity of fluid 16 does not completely fill the volume of the cavity 32 of the bladder 14 such that the fluid 16 is displaceable within the cavity 32 of the bladder 14 as the upper portion 14A of the bladder 14 is forced downward toward the lower portion 14B thereof when the tire T is applied upon the upper portion 14A of the bladder 14 to create the image I of the footprint F of the tire T on the top side 12A of the transparent plate 12 which is viewable on the bottom side 12B of the plate 12. The image I of the footprint F of the tire T on the plate 12 results from the contrast provided between the second color of the fluid 16 (the areas of the image I in FIGS. 7A and 7B not cross-hatched) viewable where a tread of the tire T does not press the upper portion 14A of the bladder 14 against the lower portion 14B thereof on the top side 12A of the plate 12 and the first color of the opaque material of the upper portion 14A of the bladder 14 (the cross-hatched areas of the image I in FIGS. 7A and 7B) viewable where the tread of the tire T does press the upper portion 14B of the bladder 14 against the lower portion 14A thereof on the top side 12A of the plate 12. Preferably, the fluid 16 is a light-reflecting gelatinous substance, for example, a substantially colloid aluminum oxide, ceramic powder or similar substance dissolved in water and compatible with anti-freeze.

The inspection apparatus 10 further includes at least one stripe 34 applied on the bottom side 12B of the plate 12 and, particularly, to the bottom sides 24B of one of the strips 24 forming the plate 12. The stripe 34 provides a frame or line of reference in the image I. The stripe 34 is preferably disposed on the bottom side 24B of the one strip 24 of the plate 12 such that substantially equal areas of the strips 24 are on opposite sides of the stripe 34. The stripe 34 extends across the width W of the plate 12 (or along the length "l" of one of the strips 24 of the plate 12).

The transducer means 20 is attached to the bottom side 12B of the plate 12 for undergoing a deformation proportional to the deflection of the plate 12 and for producing an electrical signal proportional to the deformation. By way of example, the transducer means 20 includes a plurality of piezoelectric sensors 36 each secured to the bottom side 24B and at a central location of one of the strips 24 of the plate 12. The piezoelectric sensors 36 may be of any suitable and conventional type. Other suitable transducer means 20 may include strain gauges and other conventional sensing devices.

The vehicle tire inspective apparatus 10 further includes a protective cover sheet 38 which overlies and covers the bladder 14 for receiving thereon the inflated tire T that is applied on the bladder 14. The cover sheet 38 is preferably comprised of a substantially opaque material, such as a rubber material, and has a substantially rectangular configuration. The cover sheet 38 protects the bladder 14 and plate 12 from direct contact with any tires T of the vehicle V and from environmental factors including rain, snow and dirt. The cover sheet 38 has a size which completely covers the top side 14A of the bladder 14 and extends beyond the open top 28A of the receptacle 28. Thus, the cover sheet 38 at its periphery overlies the edges of the road surface S surrounding the open top 28A of the receptacle 28. Alternatively, the bladder 14 and cover sheet 38 can be integrated with one another such that the cover sheet 38 forms the upper portion 14A of the bladder 14.

Referring to FIGS. 3 and 5, the first receiving and converting means 18 includes means in the form of at least one and preferably a plurality of imaging devices 40, such as cameras, for viewing and recording the image I and for converting the recorded image I into an electrical signal, and means in the form of a computer 42, such as a variety of well-known types of personal computers, for receiving the electrical signal from the cameras 40 and for processing the electrical signal into a measured quantity correlated to the inflation condition of the tire T. The cameras 40 can be any suitable conventional types, such as well-known black and white cameras, CCD color video cameras and infrared and other well-known imaging devices. The imaging device may be associated with internal or external illumination sources. The cameras 40 are spaced apart an equal distance from one another and positioned in the chamber 26 of the receptacle 28 being mounted on a bottom wall 28B thereof such that lenses of the cameras 40 are spaced directly below and aimed upwardly toward the bottom side 12B of the plate 12. The computer 42 is electrically connected to the cameras 40 via suitable conventional conductor wires over which the electrical signal is transmitted from the cameras 40 to the computer 42 so that the computer 42 can be remotely located away from the site of the receptacle 28 housing the cameras 40 and the other components of the inspection apparatus 10. The computer 42 includes a series of frame grabbers 44 which receive and process the electrical signals transmitted from the cameras 40. The areas of the respective images I are determined and compared to predetermined maximum and minimum limits stored in the memory of the computer 42 and/or a local or remote data base. Any tire T outside of these predetermined limits is either under-inflated or over-inflated. Alternatively, a single imaging device with multiple lenses and connected with a single frame grabber could be utilized.

Referring to FIGS. 4 and 5, the second receiving and converting means 22 in the form of the aforementioned computer 42 receives the electrical signals generated from the plurality of piezoelectric sensors 36 of the transducer means 20, also known as strain gages, which represent the strain or deformation undergone by the sensors 36 concurrently with the deflection of the strips 24 of the plate 12. The computer 42 is electrically connected to the sensors 36 via suitable conventional conductor wires over which the electrical signals are transmitted from the sensors 36 to the remotely-located computer 42. The computer 42 includes an analog switch 46, an I/O card 48 and ADC card 50 for changing the analog signals to digital form and receiving the digital signals for processing into measured quantities proportional to the magnitude of the strain or deformation and thus the supported weight of the portion of the tire T applied to the strip 26 of the plate 12 which mounts each sensor 36. The computer 42 calculates measurements of the supported weights on all of the tires T of the vehicle and compares the measurements to determine the existing weight distribution condition of the tires T of the vehicle V so that appropriate corrective action can be taken if it is found that any one tire T is carrying more or less of the weight of the vehicle V than any other tire T. The inspection apparatus 10 also includes a suitable keyboard 52, monitor or CRT 54 and printer (including modem) 56 connected to the computer 42. The keyboard 52, monitor 54 and printer (including modem) 56 allow an operator to interact with the computer 42 for controlling the entering of instructions to the computer 42 and generating of a report based on the measurements and images taken. The report shows the footprint size of and weight supported by each tire T from which it can be readily determined whether the tire footprint sizes are within preset limits and whether the vehicle weight is evenly distributed within preset limits. The report can be used by a driver and/or maintenance personnel to review the status of each tire T. The report can also be compared to the next report the driver and/or maintenance personnel receives. Use of multiple reports based on periodic use of apparatuses 10, particularly, enables the driver and/or maintenance personnel to determine if a given tire T has a slow air leak which has not caused the tire T to fail an inspection but should still be corrected.

To explain one exemplary embodiment of the operation of the apparatus 10, reference is now made to the flow chart of FIGS. 6A to 6D. The following outlines the sequence of a computer program or system stored in and controlling the operation of the computer 42 of the apparatus 10: (1) system is powered and placed in a ready state; (2) system detects a vehicle; (3) footprint and supported weight detected for each tire; (4) each footprint is checked against absolute upper and lower limits and data base; (5) tandem tire sets are checked against each other (looking for a low or flat tire); (6) front and rear tire groups are checked for correct weight distribution by axle type; (7) footprint and supported weight of each tire are checked against all other tires by axle type; (8) report[ed] is generated for the driver and/or maintenance personnel; and (9) system returns to ready state.

Figure 6A:
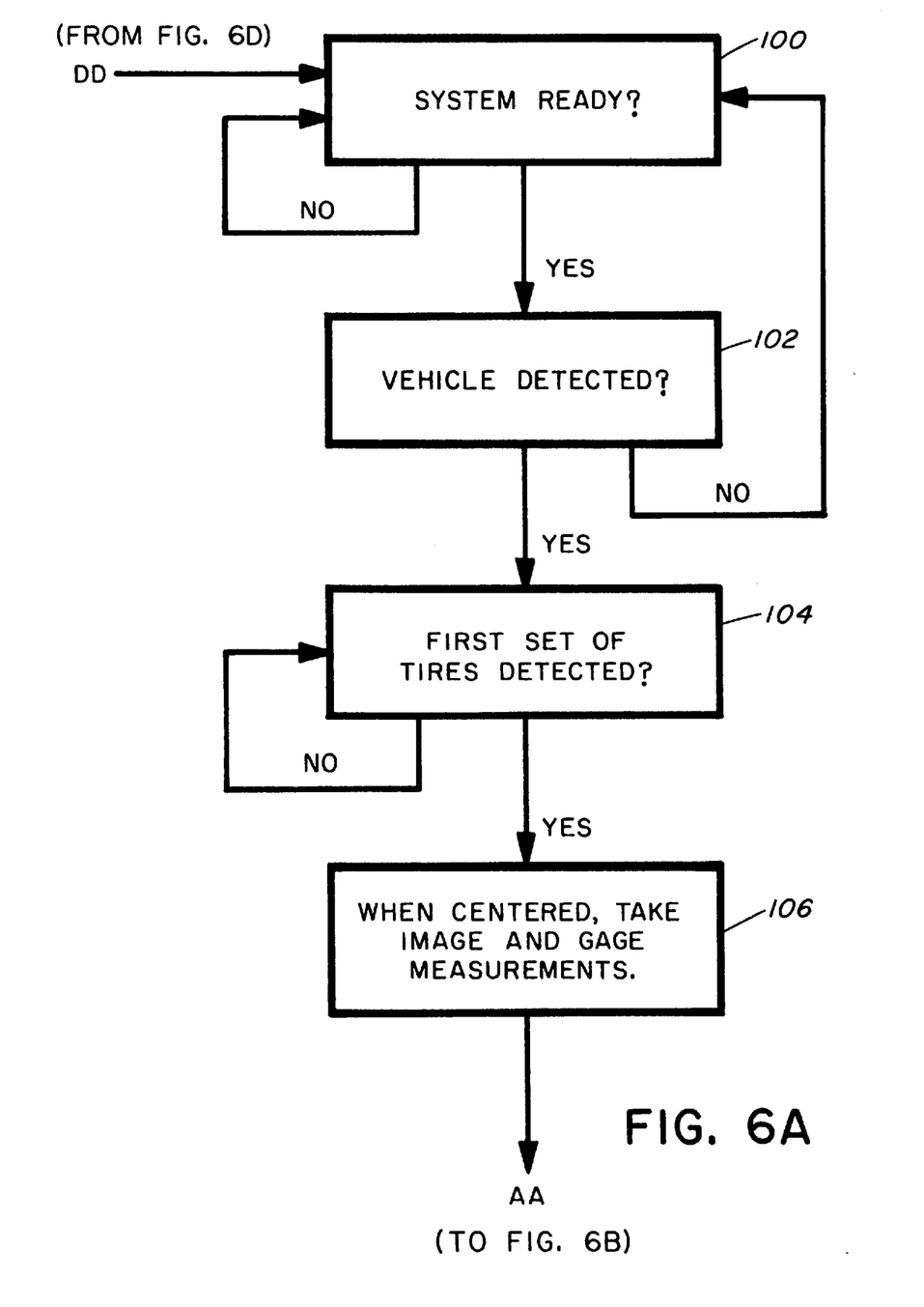
FIGS. 6A to 6D comprise a flow chart representing the method of operation of the vehicle tire inspection apparatus.

Referring now to FIG. 6A, the computer 42 initially ask itself the first question, is the "System Ready?", as represented by block 100. If the answer is "No," then the program or system loops back and remains at block 100. If the answer is "Yes," then the system goes to block 102 which asks the second question, is a "Vehicle Detected?" If no vehicle has driven onto the apparatus 10, then the answer to the second question in block 102 is "No" causing the system to loop back and return to block 100. If the answer to the second question is "Yes" the system proceeds to block 104. Block 104 asks the third question, is a "First Set Of Tires (axle) Detected?" If the tires of the vehicle have not yet reached the plate 12 of the apparatus 10, then the answer to the third question is "No" and the system loops back and remains at block 104. If the tires have reached the plate 12 of the apparatus 10, the answer to the third question is "Yes" and the system goes to block 106 where the computer 42 is instructed "When centered, take image and gage measurements." The "gage measurement" refers to a measure of the deflection of the plate 12 and deformation or strain of the sensors 36.

Figure 6B:
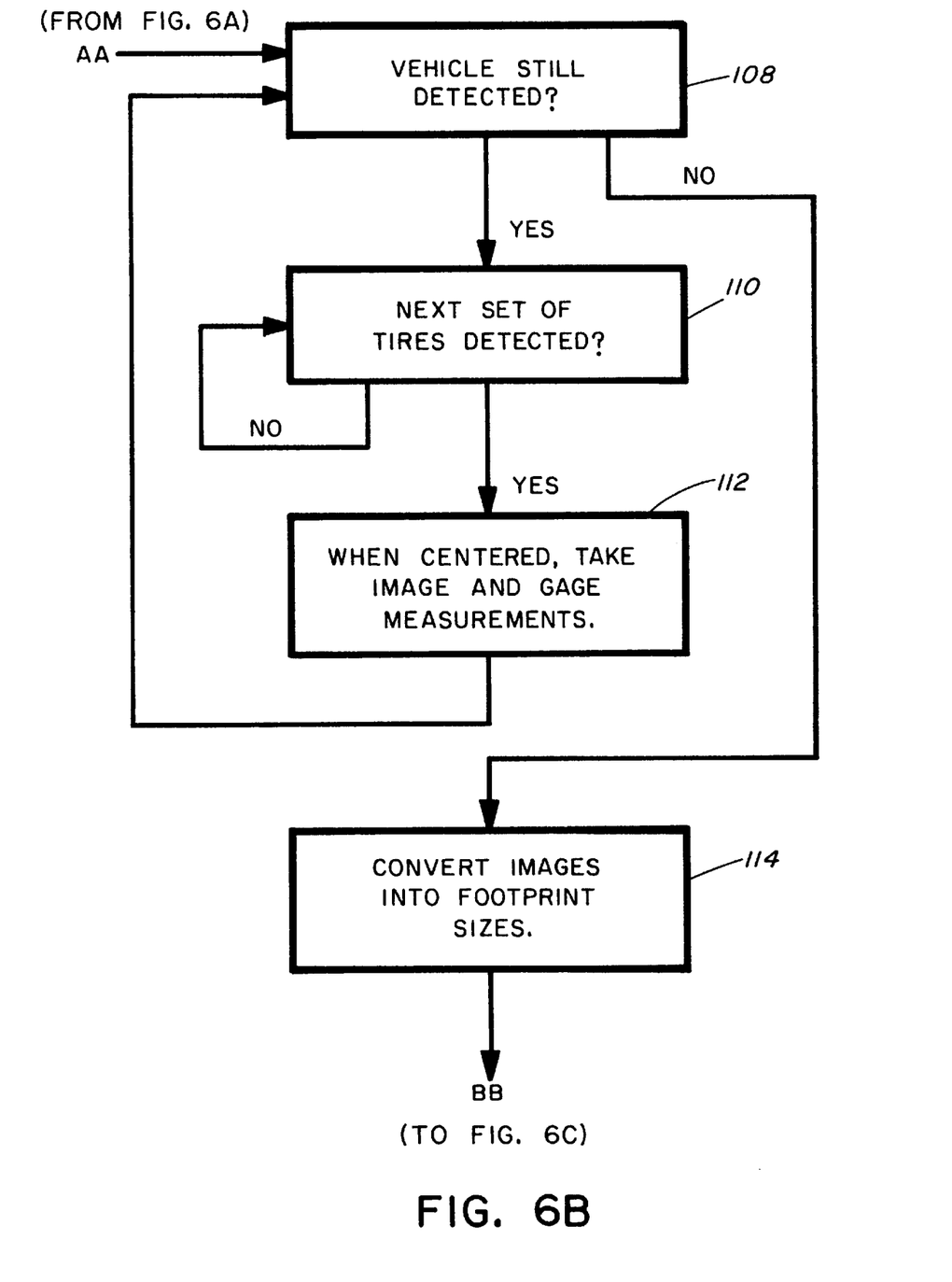

Referring now to FIG. 6B, after completion of the task in block 106, the system proceeds to block 108 which asks the fourth question, is the "Vehicle still detected?" If the answer to the fourth question is "No", then the system goes to block 114. If the answer is "Yes", then the system goes to block 110. At block 110, the system asks the fifth question, is the "Next Set Of Tires (axles) Detected?" If the answer to the fifth question is "No" then the system loops back and remains at block 110. If the answer is "Yes" then the system goes to block 112 where the computer 42 is instructed, "When centered, take image and gage measurements," as was also the instruction to the computer 42 of block 106. After completion of the task in block 112, the system returns to block 108. If the answer to the fourth question of block 108 is now "No", the system then proceeds to block 114. Block 114 instructs the computer 42 to "Convert images into footprint sizes."

Figure 6C:
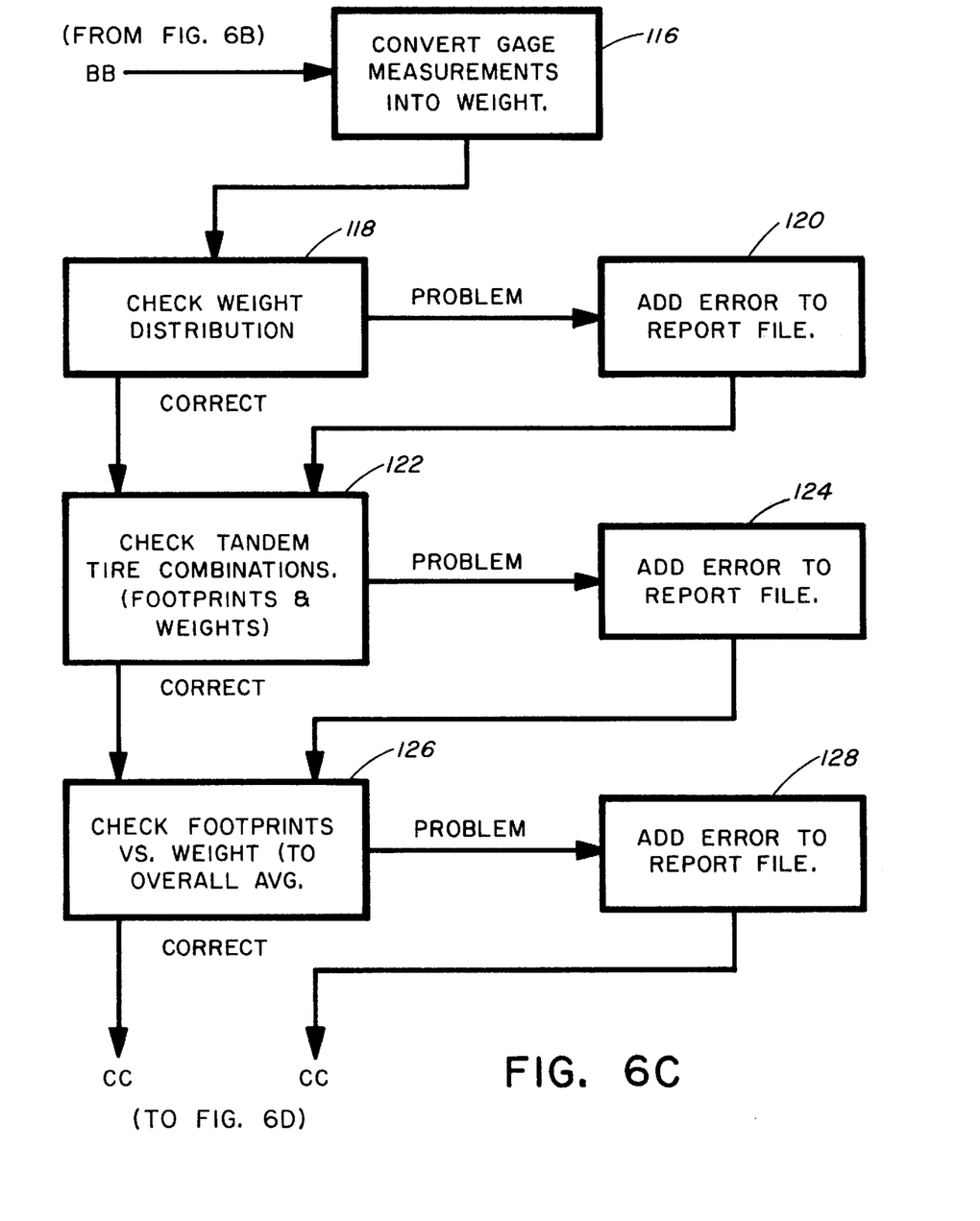

Referring now to FIG. 6C, after completion of the task in block 114, the system proceeds to block 116. Block 116 instructs the computer 42 to "Convert gage measurements into weight." After completion of the task in block 116, the system proceeds to block 118 which instructs the computer 42 to "Check weight distribution." If there is a problem with the weight distribution, the system then goes to block 120 which instructs the computer 42 to "Add error to report file." After the error is reported or if the weight distribution was correct, the system then goes to block 122. Block 122 instructs the computer 42 to now "Check tandem tire combinations (footprints & weights)." If there is a problem, the system goes to block 124 which instructs the computer 42 to "Add error to report file." After the error is reported or if the tandem tire combinations are correct, the system then goes to block 126. Block 126 instructs the computer 42 to now "Check footprints vs. weight (to overall avg.)." If there is a problem, the system goes to block 128 which instructs the computer 42 to "Add error to report file."

Figure 6D:
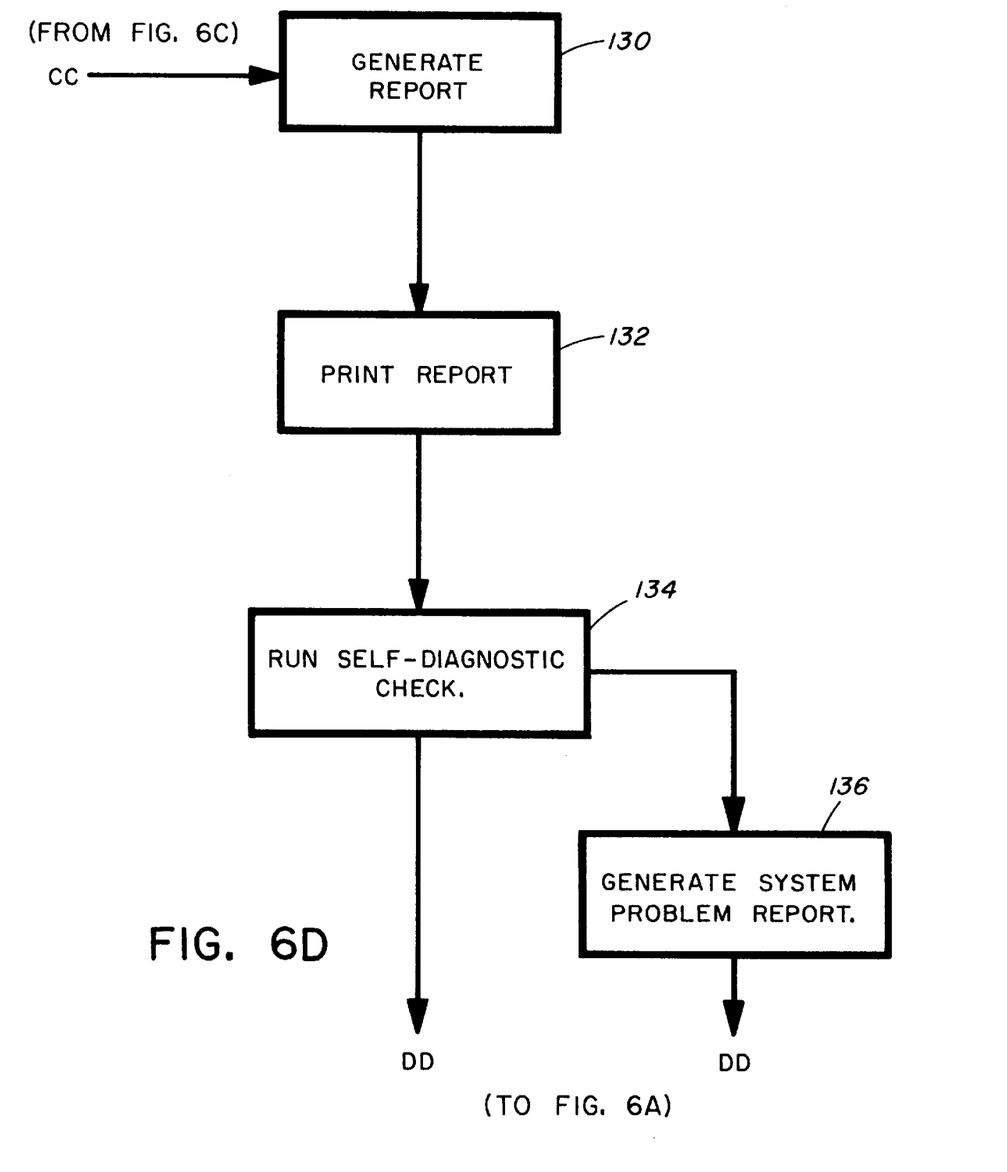

Referring now to FIG. 6D, after the error is reported or if the footprints compared to the weight are correct, the system now goes to block 130. Block 130 instructs the computer 42 to "Generate report." After completion of the task in block 130, the system proceeds to block 132 which instructs the computer 42 to "Print Report." After completion of the task in block 132, the system goes to block 134 which instructs the computer 42 to "Run self-diagnostic check." After completion of the task in block 134, the system goes either to block 136 or returns to initial block 100. Block 136 instructs the computer 42 to "Generate system problem report." After completion of the task in block 136, the system returns to initial block 100 of FIG. 6A. It should be understood that the processing of the images and measurements can be carried out after all sets of tires or after each set of tires have been detected and the images and measurements taken.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. Apparatus for inspecting inflation condition of and supported weight on an inflated vehicle tire, comprising:

(a) a plate having opposite top and bottom sides and made of a substantially transparent yieldable resilient bendable material capable of transmitting a footprint of an inflated vehicle tire and undergoing a deflection in response to the supported weight on the inflated vehicle tire applied thereon;

(b) a flexible bladder supported on said top side of said plate and having opposite upper and lower portions and an enclosed interior cavity, said upper portion of said bladder comprised of a substantially opaque material of a first color, said lower portion of said bladder comprised of a substantially transparent material;

(c) a quantity of fluid contained within said cavity of said bladder of a second color different from said first color of said upper portion of said bladder, said fluid being displaceable within said bladder as said upper portion of said bladder is forced toward said lower portion thereof when the inflated vehicle tire is applied upon said upper portion of said bladder so as to create an image of the footprint of the inflated vehicle tire viewable on said bottom side of said plate by contrast between said second color of said fluid viewable where a tread of the inflated vehicle tire does not press said upper portion of said bladder against said lower portion thereof on said top side of said plate and said first color of said opaque material of said upper portion of said bladder viewable where the tread of the inflated vehicle tire does press said upper portion of said bladder against said lower portion thereof on said top side of said plate; and (d) first means for receiving and converting said image of the footprint of the inflated vehicle tire to a first measured quantity correlated to the inflation condition of the inflated vehicle tire;

(e) transducer means attached to said bottom side of said plate for undergoing a deformation proportional to said deflection of said plate and for producing an electrical signal proportional to said deformation; and (f) second means for receiving and converting said electrical signal to a second measured quantity proportional to the supported weight applied by the inflated vehicle tire to said plate.

2. The apparatus of claim 1 wherein said first measured quantity is proportional to an area of said opaque material of said upper portion of said bladder viewable through said transparent materials of said lower portion of said bladder and of said plate.

3. The apparatus of claim 1 further comprising:
a cover sheet overlying and covering said bladder for receiving thereon the inflated vehicle tire applied on said bladder.

4. The apparatus of claim 1 wherein said plate is substantially flat.

5. The apparatus of claim 1 wherein said plate has a stripe thereon viewable on said bottom side of said plate for providing a line of reference with respect to said image.

6. The apparatus of claim 1 wherein said fluid is a light-reflecting substance.

7. The apparatus of claim 1 wherein said fluid is a gelatinous substance.

8. The apparatus of claim 1 wherein said first means for receiving and converting means said image includes:
means for viewing and recording said image and for converting said recorded image into an electrical signal; and
means for receiving said electrical signal from said viewing and recording means and for processing said electrical signal into said first measured quantity correlated to the inflation condition of the inflated vehicle tire.

9. The apparatus of claim 8 wherein said viewing and recording means is at least one imaging device disposed below said bottom side of said plate.

10. The apparatus of claim 8 wherein said receiving and processing means is a computer electrically connected to said viewing and recording means.

11. The apparatus of claim 1 wherein said transducer means includes is a plurality of piezoelectric transducers mounted to said bottom side of said plate.

12. The apparatus of claims 1 wherein said plate is formed by a plurality of strips disposed in a side-by-side relationship, each of said strips having opposite top and bottom sides, said top side of each of said strips for receiving a portion of the inflated vehicle tire applied thereon, said strips being made of the yieldable resilient bendable material capable of undergoing said deflection in response to the inflated vehicle tire applied thereon.

13. The apparatus of claim 12 wherein said transducer means includes is a plurality of piezoelectric sensors each secured to said bottom side of one of said strips of said plate.

14. The apparatus of claim 13 wherein each of said piezoelectric sensors is secured to a central location on said bottom side of one of said strips of said plate.

15. The apparatus of claim 1 wherein said second means for receiving and converting means said electrical signal is a computer electrically connected to said transducer means.

* * * * *